United States Patent [19]

Pawsat

[11] 4,063,798
[45] Dec. 20, 1977

[54] REFLECTIVE, RAT-TRAP BICYCLE PEDAL

[75] Inventor: Carlton P. Pawsat, Maysville, Ky.

[73] Assignee: Wald Manufacturing Co., Inc., Maysville, Ky.

[21] Appl. No.: 716,542

[22] Filed: Aug. 23, 1976

Related U.S. Application Data

[63] Continuation of Ser. No. 548,274, Feb. 10, 1975, abandoned.

[51] Int. Cl.² .............................................. G02B 5/12
[52] U.S. Cl. .................................... 350/99; 74/594.1; 301/37 R; 350/105
[58] Field of Search .......................... 350/99, 102–105; 301/37 R; 74/594.4; 280/282

[56] References Cited

U.S. PATENT DOCUMENTS

| 3,659,478 | 5/1972 | Pawsat et al. ...................... 74/594.4 |
| 3,797,912 | 4/1974 | Humlong ............................. 350/99 |

FOREIGN PATENT DOCUMENTS

| 102,220 | 10/1937 | United Kingdom ................ 74/594.4 |

Primary Examiner—John K. Corbin
Assistant Examiner—B. W. delos Reyes
Attorney, Agent, or Firm—J. Warren Kinney, Jr.

[57] ABSTRACT

The raised, serrated or scalloped, foot-supporting edges of a rat-trap pedal are formed integral with the reflector-retainer members which are secured to and carried by the side legs of the pedal frame.

10 Claims, 6 Drawing Figures

U.S. Patent     Dec. 20, 1977     4,063,798
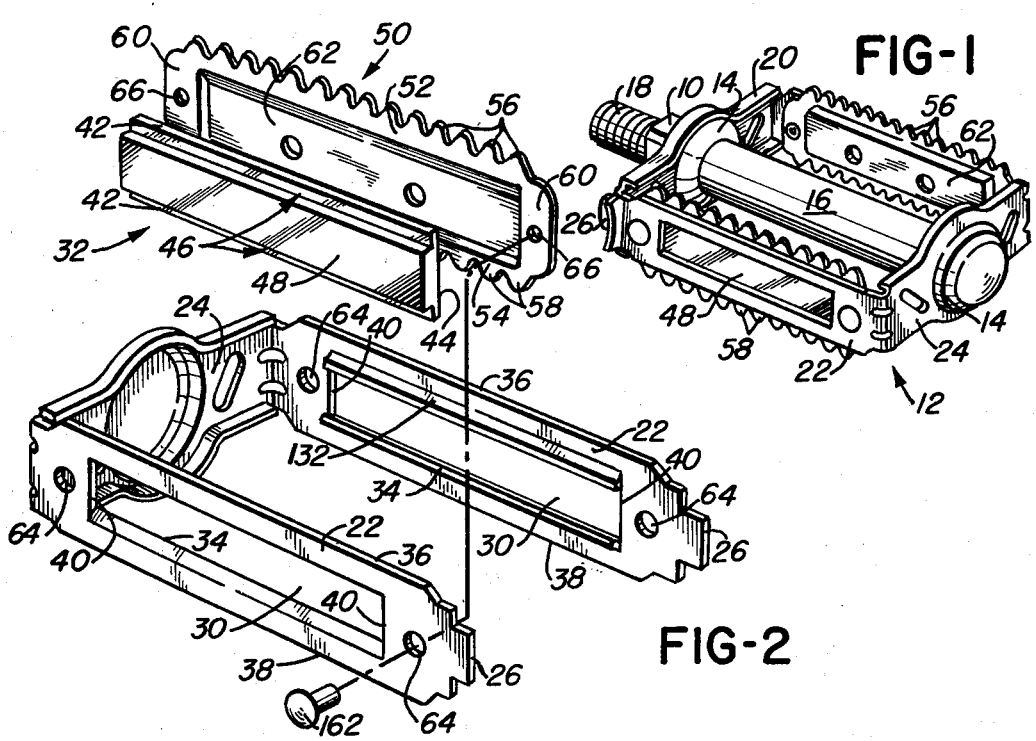
FIG-1
FIG-2
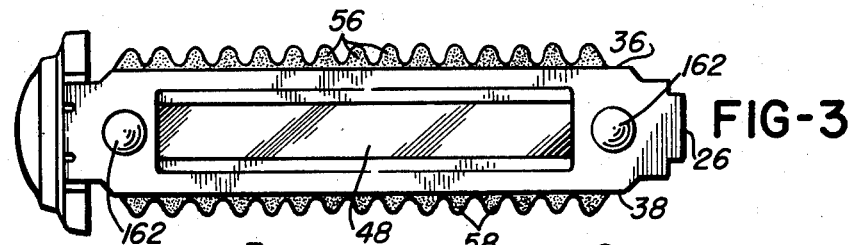
FIG-3
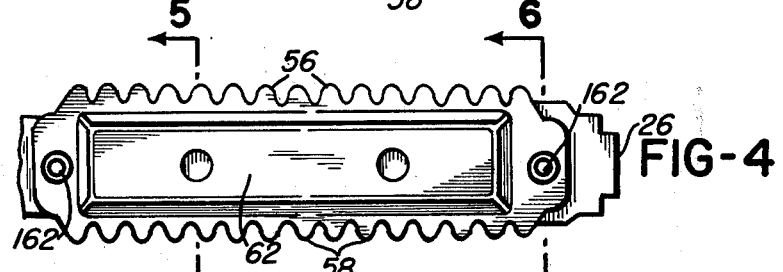
FIG-4
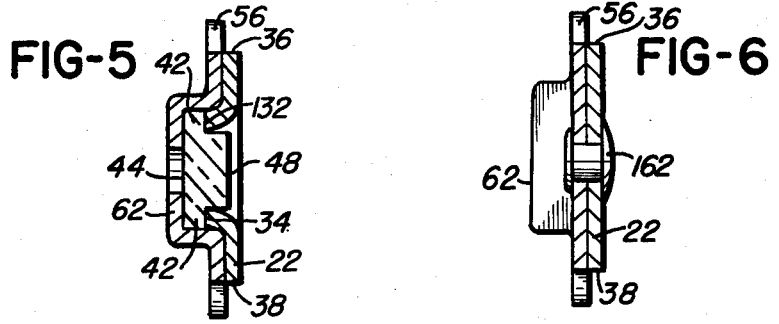
FIG-5     FIG-6

REFLECTIVE, RAT-TRAP BICYCLE PEDAL

This is a continuation, of application Ser. No.. 548,274, filed Feb. 10, 1975, now abandoned.

BACKGROUND OF THE INVENTION

1. Field of the Invention

This invention relates generally to reflective, rat-trap pedals.

2. Description of the Prior Art

Reflective, rat-trap pedals are disclosed in U.S. Pat. Nos. D-233,223; D-233,224; and 3,797,912, owned by the assignee of this application. In the aforesaid patents the raised, serrated or scalloped, foot-supporting edges are formed as an integral part of the side legs of the pedal frame. The following patents also disclose rat-trap bicycle pedals: German Pat. No. 668,458, dated Nov. 10, 1938, and the references of record in each of the aforesaid U.S. design Pat. Nos. D-233,223 and D-233,224.

SUMMARY OF THE INVENTION

The subject invention relates to a reflective pedal for use on bicycles, and other cycles, and in particular to a reflective, rat-trap pedal. In accordance with the present invention, the rat-trap portion of the pedal which is defined by an elevated, serrated or scalloped, non-slip surface for supporting the foot of a cyclist is formed integral with the upper and lower edges of a reflector-retainer member which, in turn, is secured to and carried by the side legs of a bicycle pedal frame in such a manner that the scalloped, upper and lower edges of the reflector-retainer extend outwardly of and beyond the upper and lower edges of the side legs of the pedal-frame to which it is anchored.

An object of the invention is to provide a simple, yet highly effective reflector-retainer member with serrated or scalloped, rat-trap defining side edges, thereby decreasing the cost, increasing the effectiveness of the resultant pedal while substantially decreasing the need for "rework" of finished pedals due to imperfections in the finish of the pedal, which imperfections, though not adversely effecting the strength of the pedal nevertheless detract from its overall appearances.

BRIEF DESCRIPTION OF THE DRAWINGS

FIG. 1 is a perspective view of a reflective, rat-trap bicycle pedal embodying the teachings of the present invention.

FIG. 2 is an exploded, partial perspective view of FIG. 1, but from the opposite end thereof, diclosing certain of the elements thereof which embody the teachings of the present invention, in exploded relationship.

FIG. 3 is a side elevation of FIG. 2 with the reflector and reflector-retaining means in place.

FIG. 4 is a side elevation of the inner surface of the other leg of the pedal frame of FIG. 3.

FIG. 5 is a sectional view taken on line 5—5 of FIG. 4.

FIG. 6 is a sectional view taken on line 6—6 of FIG. 4.

DESCRIPTION OF THE PREFERRED EMBODIMENTS

FIG. 1 illustrates a "rat-trap" pedal which includes an axle 10 which supports bearings (not illustrated) at opposite ends of a rectangularly shaped pedal frame denoted generally by the numeral 12. The location of the bearings are indicated at 14, at opposite ends of a frame tube 16 through which axle 10 extends. One end of axle 10 projects from one end of the frame terminating in a threaded stud 18 which permits it to be attached to the crank of a drive sprocket (not illustrated) of a bicycle or the like.

The pedal frame is a composite structure which includes an end plate 20 and a U-shaped member defined by laterally spaced side legs 22 and end leg 24. Each of side legs terminate in tangs 26 which are inserted into openings in end plate 20 and thereafter staked to secure the elements in the fully assembled relation illustrated in FIG. 1.

The aforesaid construction and structural details of the pedal frame, stem and bearings are well known in the art and form no part of the present invention, except to provide a background for the details hereinafter described.

Each of side legs 22 of the pedal frame are provided with an elongate opening 30 for the reception of an elongate reflector panel 32.

In the preferred embodiment of the invention, and as clearly illustrated in FIG. 2, the upper and lower edges of openings 30 are defined by upper and lower inturned edges 132 and 34, each of which are disposed in spaced parallelism with straight, parallel, upper and lower edges 36 and 38 of side legs 22. The ends of openings 30 are defined by vertical edges 40.

The upper and lower side edges of reflector 32 are provided with lips 42, which are disposed along the rear surface 44 of the reflector for providing an elongate notch or track 46 along the sides of the outer surface 48 of the reflector. The dimensions of the outer surface of the reflector are such as to be received within openings 30 of side legs 22 of the pedal frame with lips 42 in abutting relationship with the upper and lower edges 132 and 34 of said openings.

The numeral 50 designates generally a combination rat-trap-tread and reflector retainer member having upper and lower panels 52 and 54 whose outer edges are provided with serrated or scalloped edges 56 and 58 and with end panels 60 and a centrally disposed, recessed area 62 which is dimensioned to snugly receive the rear side of reflector 32 including lips 42.

The inner surface of upper and lower panels 52–54 and end panels 60 are flat and disposed in a common plane.

Each of the members 50 are adapted to be securely fastened to the inner surface of the side legs 22 of the pedal frame by means of a rivet 162, or the like, which passes through aligned openings 64 and 66 of the side legs of the pedal frame and end panels 60 of member 50, respectively, for permanently securing the said member to the pedal frame.

As best illustrated in FIGS. 3–6, the serrated or scalloped, upper and lower edges 56 and 58 of the reflector-retainer are spaced apart by a dimension greater than the spacing between the upper and lower edges 36 and 38 of the side legs of the pedal frame.

It is customary to provide a finish on the pedal frame, such as, by means of plating, prior to assembly of the pedal.

Rat-trap pedal tread surfaces that are formed as an integral part of a reflector-retainer, such as disclosed in U.S. Pat. No. 3,797,912, render it most difficult, if not impossible, to remove burrs and sharp edges from the tread surface by tumbling, without subjecting the entire frame to the tumbling process which in turn destroys the smooth finish and at times deforms the pedal frames. The subject invention enables the manufacturer to remove the burrs and sharp edges from the reflector-retainer members 50 separate and apart from, and without subjecting the pedal frame per se to a tumbling process.

Then, after the member 50 have been suitably processed and finished, they are secured to the side legs of a pedal frame for permanently mounting a reflector relative to the side legs of the pedal frame, thereby completing the reflective rat-trap pedal.

It will be noted that since the rat-trap tread surfaces are an integral part of the reflector-retainer, the die required to produce the pedal frame is considerably less complicated and expensive to build and easier to maintain than in those instances in which the rat-trap tread surfaces are an integral part of the side legs of the pedal frame. The rat-trap tread surfaces that are an integral part of the reflector-retainer permit the serrating or scallop forming devices to be incorporated into the dies that produce the relatively flat and less complicated part 50, thereby making the serrating or scallop forming devices considerably less expensive and easier to maintain.

A further practical advantage of providing a rat-trap tread surface as an integral part of the reflector-retainer is that it allows for contrasting finishes and/or color to be used between the frame and tread surfaces which, in turn, provides a pleasing two-tone effect to the overall appearance of the completed pedal, such as, by way of example, is illustrated in FIG. 3, wherein the stippling on the upstanding scalloped portions indicate a contrasting finish or color relative to the finish and/or color of the outer surface of the side leg of the pedal frame.

What is claimed is:

1. A rat-trap reflector pedal comprising:
   a. a pedal frame having a pair of elongate, laterally spaced side legs each having spaced, parallel, upper and lower edges and each having an elongate aperture therein intermediate the upper and lower edges thereof;
   b. a reflector having a reflective surface disposed within the aperture of each of said side legs;
   c. a pair of combination rat-trap-tread and reflector retainer members having serrated upper and lower edges and disposed along and on opposite sides of an intermediate portion of the pedal frame side legs, wherein the said upper and lower serrated edges are spaced apart by a dimension greater than the spacing between the upper and lower edges of the side legs of the pedal frame, said members engaging and retaining the reflectors in place in the respective pedal frame apertures, and
   d. means securing said members, one each, to a side leg of the pedal frame with the serrated edges thereof projecting outwardly beyond the respective upper and lower edges of the side leg of the pedal frame, whereby the pedal frame may be made with a bright finish, and the combined reflector-retainer and rat-trap-tread members separately finished as desired for attachment to the pedal frame.

2. A pedal as called for in claim 1, wherein the reflector retainer has a finish which contrasts with the finish of the side legs of the pedal frame.

3. A pedal as called for in claim 1, wherein the serrated edges of the combination rat-trap-tread and reflector retainer member define and constitute an elevated, non-slip surface for supporting the foot of a cyclist.

4. A pedal as called for in claim 1, wherein the intermediate portion of the combination rat-trap-tread and reflector retainer member includes an elongate, reflector-receptive pocket.

5. A pedal as called for in claim 4, wherein the reflector-receptive pocket includes top, bottom, side, and end walls which act upon corresponding surfaces of the reflector, whereby the reflector is fixedly mounted relative to the side legs of the pedal frame.

6. A pedal as called for in claim 1, wherein the reflector has a forward portion adapted to be received within and project into the aperture in the side leg of the pedal frame, and a rear portion including marginal side flanges which abut against the inner surface of the side legs adjacent said aperture, said reflector retainer member acting upon the rear portion of the reflector for holding it in position relative to the side leg of the pedal frame.

7. A pedal as called for in claim 6, wherein the elongate aperture in each of said side legs of the pedal frame is defined by upper and lower edges which constitute an abutment for the marginal side flanges of the reflector, the reflective surface of which is disposed within said aperture.

8. A rat-trap reflector pedal comprising:
   a. a rectangular pedal frame defined by an inner end plate, an outer end plate and a pair of elongate, laterally spaced side legs each being integral with said outer end plate, wherein each side leg includes a pair of vertically spaced parallel, substantially straight, upper and lower edges, and wherein an elongate aperture is provided in each side leg intermediate the upper and lower edges thereof;
   b. a pair of reflectors having a reflective surface disposed within the aperture of each of said legs;
   c. a pair of combination rat-trap-tread and reflector retainer members secured to said side legs, wherein each member includes a pair of spaced, parallel serrated upper and lower foot supporting edges, and wherein the spacing between the serrated edges of said member is greater than the spacing between the upper and lower edges of the side legs of the pedal frame, said members each having defined therein an intermediate, recessed area located thereon to correspond to said side leg aperture when said reflector is received within said aperture; and
   d. means securing said members one each to the inner surface of the side legs of the pedal frame with the serrated upper and lower edges projecting outwardly beyond the respective upper and lower edges of the side leg of the pedal frame thereby defining a rat-trap-tread, and with the recessed area of said members housing and fixedly mounting the reflectors relative to the apertures of their respective side legs, whereby the pedal frame may be made with a bright finish, and the combined reflector-retainer and rat-trap-tread members separately finished as desired for attachment to the pedal frame.

9. A rat-trap pedal comprising:
   a pedal frame being laterally spaced side legs each having parallel, straight, upper and lower outer edges;

a pair of separate rat-trap-tread-defining members each of which comprise an elongate, rigid member having parallel, serrated upper and lower outer edges, wherein the spacing between the upper and lower serrated edges exceeds the spacing between the upper and lower edges of the side legs of the pedal frame; and means securing said members to the side legs of the pedal frame with the serrated edges of said members projecting outwardly beyond the outer edges of the side legs of the pedal frame, thereby defining a rat-trap-tread, whereby the pedal frame may be made with a bright finish, and the rat-trap-tread-defining members separately finished as desired for attachment to the pedal frame.

10. A pedal as called for in claim 1, wherein the forces applied by the foot of a cyclist to a pedal is directed onto the serrations of the serrated portions of the combination rat-trap-tread, and reflector retainer member thence to the side legs of the pedal frame through the means by which the said member is secured to said side legs.

* * * * *